United States Patent Office 3,420,898
Patented Jan. 7, 1969

3,420,898
SINGLE STAGE HYDROFORMYLATION OF OLEFINS TO ALCOHOLS
John L. Van Winkle, San Lorenzo, Rupert C. Morris, Berkeley, and Ronald F. Mason, Mill Valley, Calif., assignors to Shell Oil Company, New York, N.Y., a corporation of Delaware
No Drawing. Filed June 30, 1965, Ser. No. 468,573
U.S. Cl. 260—632                 10 Claims
Int. Cl. C07c 29/16; C07g 15/06

ABSTRACT OF THE DISCLOSURE

The direct, single-stage production of reaction products consisting predominantly of primary alcohols by reacting an olefinic compound with carbon monoxide and hydrogen at a temperature between about 100° and 300° C. and superatmospheric pressure in the presence of a catalyst of cobalt in complex combination with carbon monoxide and a bicyclic heterocyclic tert-phosphine.

---

This invention relates to the production of alcohols from olefinically unsaturated compounds and novel catalysts therefor. The invention relates more particularly to the production of primary alcohols by the addition of carbon monoxide and hydrogen to olefinic hydrocarbons in the presence of a new and improved catalyst.

Processes directed to the production of reaction mixtures comprising substantial amounts of aldehydes and at times lesser amounts of alcohols by the reaction of olefinic compounds with carbon monoxide and hydrogen at elevated temperatures and pressure in the presence of certain catalysts are well known in the art. The aldehydes and alcohols produced generally correspond to the compounds obtained by the addition of a carbonyl or carbinol group to an olefinically unsaturated carbon atom in the starting material with simultaneous saturation of the olefin bond. Isomerization of the olefin bond may take place to varying degrees under certain conditions with the consequent variation in the products obtained. These processes known in the industry and referred to herein as hydroformylation, involve reactions which may be shown in the general case by the following equation:

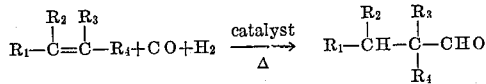

and/or

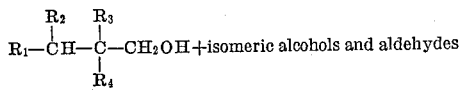

In the above equation, each R represents an organic radical, for example hydrocarbyl, or a suitable atom such as hydrogen. The above reaction is similarly applied to an olefinic linkage in a cycloaliphatic ring.

A disadvantage of hydroformylation processes disclosed heretofore is their dependence upon the use of catalysts, such as dicobalt octacarbonyl, which generally necessitate the use of exceedingly high pressures to remain stable under the conditions therein employed. A further disadvantage of many of the processes disclosed heretofore is their inability to produce hydroformylation products directly comprising substantial amounts of alcohols, thereby necessitating a separate aldehyde hydrogenation step when alcohols are a desired product. The products of hydroformylation products having a relatively high normal to branched product isomer ratio is often also exceedingly difficult if at all possible in many of the practical scale processes heretofore disclosed.

In copending U.S. application of L. H. Slaugh and R. D. Mullineaux, Ser. No. 280,132, filed May 13, 1963, now U.S. 3,239,569, is described a hydroformylation process to effect the direct, single-stage hydroformylation of olefins to a reaction mixture wherein the alcohols predominate over the aldehydes, utilizing substantially lower pressures and a cobalt catalyst comprising cobalt in complex formation with carbon monoxide and a phosphorus-containing ligand consisting essentially of a tertiary organophosphine, such as tri-n-butylphosphine.

A shortcoming in the aforementioned process utilizing trihydrocarbylphosphines such as tributylphosphine is the conversion of a portion of the starting olefin to saturated hydrocarbon, a side reaction decreasing the yield of the desirable and commercially valuable alcohol product. Another is a relatively slow rate of hydroformylation.

It is therefore an object of the present invention to provide novel catalysts for use in an improved hydroformylation process to effect the direct, single-stage hydroformylation of olefins to produce reaction products consisting predominantly of primary alcohols and at the same time to reduce the quantity of side-reaction forming saturated hydrocarbon.

Another object of the present invention is the provision of an improved hydroformylation process enabling the more efficient production of primary alcohols by rapid reaction of olefinic compounds with carbon monoxide and hydrogen in the presence of a new and improved hydroformylation catalyst. Other objects and advantages of the present invention will become apparent from the following detailed description thereof.

In accordance with the present invention, olefinic compounds are converted to primary alcohols having one more carbon atom than the olefinic compounds by reacting the olefinic compounds in liquid phase, with carbon monoxide and hydrogen, at a temperature between about 100° and about 300° C. in the presence of a novel catalyst comprising cobalt in complex combination with carbon monoxide and a particular class of tertiary organophosphines.

In their active form, the suitable novel complex catalysts contain the cobalt in a reduced valence state. This will normally be a zero valence state and may suitably be even lower, such as a —1 valence state. As used throughout this specification and claims, the term "complex" means a coordination compound formed by the union of one or more electronically rich molecules or atoms capable of independent existence with one or more electronically poor molecules or atoms, each of which is also capable of independent existence.

In the suitable special class of ligands described hereinafter containing trivalent phosphorus comprised in the novel complex catalyst employed in the process of the invention, the phosphorus atom has one available or unshared pair of electrons. When trivalent phosphorus has such an electronic configuration, it is capable of forming a coordinate bond with cobalt in its 0 and —1 valence state. It will thus operate as a ligand in forming the desired novel cobalt complexes used as catalysts in the present invention.

The specific class of tertiary organophosphine, which is a suitable ligand of the novel cobalt-containing catalysts of the present invention, is a bicyclic heterocyclic tert-phosphine. Generically, these compounds are hydrocarbyl-substituted monophosphabicyclohydrocarbons, saturated or unsaturated, of 8 to 9 atoms in which the smallest phosphorus-containing ring contains at least 5 atoms, and the phosphorus atom therein is a member of a bridge linkage but is not a bridgehead atom. In addition to the hydrocarbyl substitution on the phosphorus atom, the ring carbons may also be substituted. However, it is preferred that such C-substituents be limited to non-bulky ones.

A particularly useful group of such phosphines includes hydrocarbyl-substituted monophosphabicycloalkanes having from 8 to 46 carbon atoms, preferably from 12 to 40, and which is represented by the formula

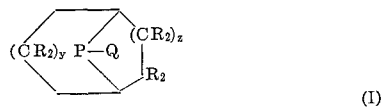

(I)

wherein Q represents hydrocarbyl, $y$ and $z$ represent positive integers whose sum is from 2 to 3 and each of which has a minimum value of 1, and R represents hydrogen and lower alkyl of from 1 to 4 carbon atoms, such as methyl, ethyl, propyl, and butyl. It is preferred that no more than two R groups be alkyl at any one time and that each of these be attached to a different ring carbon. It is to be understood that in the foregoing graphic formula and those appearing hereinafter the line portion of the structure represents a conventional organic chemical covalent bond with saturated carbon atom at each indicated intersection, the saturation being by the required number of hydrogen atoms or hydrocarbyl radicals.

The term "hydrocarbyl" is used in its accepted meaning as representing a radical formed from a hydrocarbon by removal of a hydrogen atom. The hydrocarbyl groups represented by Q in the formula above may be any non-acetylenic organic radical composed solely of carbon and hydrogen. The widest variation is possible in that the (non-acetylenic hydrocarbyl group may be alkyl, alkenyl, cycloalkyl, cycloalkenyl, aryl, aralkyl, alkaryl, single ring, multi-ring, straight chain, branched chain, large or small. Representative hydrocarbyl groups include methyl, ethyl, methallyl, n-butyl, hexyl, hexenyl, isooctyl, dodecyl, oleyl, octadecyl, eicosyl, hexacosyl, octacosyl, triacontyl, hexatriacontyl, tetracontyl, cyclohexyl, cyclooctyl, cyclooctenyl, phenyl, naphthyl, benzyl, styryl, phenethyl, and the like. Thus, a particularly useful class of bicyclic heterocyclic tert-phosphines is that containing only carbon, hydrogen, and phosphorus atoms.

Substituted hydrocarbyl groups are also operable and may contain a functional group such as the carbonyl, carboxyl, nitro, amino, hydroxy (e.g. hydroxyethyl), cyano, sulfonyl, and sulfoxyl groups. A particularly useful group of ligands consists of those in which Q is hydrocarbyl of from 1 to 36 carbon atoms; especially preferred are those in which Q is hydrocarbyl of from 4 to 30 carbons.

Hence, a preferred group of bicyclic heterocyclic tert-phosphines includes those represented by the formula

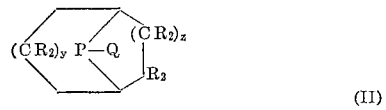

(II)

where Q represents hydrocarbyl of 1 to 36 carbons and especially of 4 to 30, $y$ and $z$ represent positive integers whose sum is from 2 to 3 and each of which has a minimum value of 1 and R is a member selected from the group consisting of hydrogen and alkyl of 1 to 4 carbons such that no more than two R groups are alkyl at any one time and that each of said alkyl groups is attached to a different ring carbon.

It is sometimes desirable to balance the size of the substituents in the aforedescribed phosphines. When the R substituents are relatively large, e.g. butyl, it may be desirable to choose a smaller Q. Conversely, when Q is large, e.g. eicosyl or hexatriacontyl, it may be desirable that the R substituents be smaller and/or less numerous, such as monomethyl or dimethyl. Particularly useful ligands are those in which the sum of R and Q is no greater than 38 carbon atoms and those in which the total number of carbon atoms is no greater than 46.

The monophosphabicycloalkanes in which the phosphorus atom is substituted with hydrocarbyl are described in copending U.S. application of R. F. Mason et al., Ser. No. 468,572, filed on the same day. Thus, they may be prepared by the reaction of a primary phosphine with suitable cyclic diolefinic compounds. For example, 9-hydrocarbyl-9-phosphabicyclononanes, in which the smallest phosphorus-containing ring contains at least 5 atoms, are derived from 1,5-cyclooctadienes, including those with ring carbon substituents, which in turn are obtainable by the cyclodimerization of conjugated diolefins, such as butadiene and isoprene. Similarly 8-hydrocarbyl-8-phosphabicyclo[3.2.1]octanes can be obtained from 1,4-cycloheptadiene and substituted 1,4-cycloheptadienes. Unsaturated monophosphabicyclohydrocarbons in which the phosphorus atom is substituted with hydrocarbyl are obtainable from the aforementioned monophosphabicycloalkanes. The P-hydrocarbyl monophosphabicycloalkane is first converted from a tertiary phosphine to a phosphine oxide by conventional methods, e.g. air oxidation, to protect the phosphorus grouping in the subsequent halogenation step. Halogenation, e.g. with bromine, places one or more halogen atoms in the ring structure especially at the bridgehead carbon positions. Dehydrohalogenation, e.g. removal of HBr by heating with concentrated alcoholic-KOH or tertiary amine, yields the corresponding unsaturated phosphine oxide. The unsaturated phosphine oxide is then reduced to the desired unsaturated tert-phosphine, i.e. the P-hydrocarbyl unsaturated monophosphabicyclohydrocarbon, by reduction of the

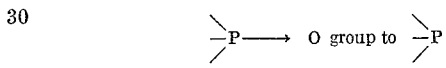

by treatment with a silicon compound containing one or more Si-H bonds or a precursor thereof, by the methods described in Canadian Patents 694,465, issued Sept. 15, 1964; 701,926, issued Jan. 12, 1965; and 707,769, issued Apr. 13, 1965.

Suitable and novel catalysts of the invention include the tertiary organophosphine-cobalt-carbonyl complexes represented by the empirical formula

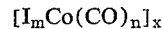

wherein I is the aforedescribed tert-phosphine containing Q, R, $y$ and $z$ members which are represented as above, $m$ and $n$ represent positive integers, each having a value of at least 1 and whose sum is 4, and $x$ represents a positive integer from 1 to 3. Preferred catalysts of the above-defined class comprise those wherein R represents hydrogen or lower alkyl of 1 to 4 carbons such that no more than two R groups are alkyl at any one time and that each of said alkyl groups is attached to a different ring carbon, and Q represents hydrocarbyl containing from 1 to 36 carbon atoms. A particularly preferred group of catalysts within the above-defined class are the bicyclic heterocyclic tert-phosphine-cobalt-carbonyl complexes wherein the number of carbons in the Q member of the tertiary phosphine I is from 4 to 30.

It is to be understood that the suitable novel catalysts identified by the foregoing empirical Formula III may comprise two different I ligands and even two or more of the $I_mCo(CO)_n$ groups. For example, in the suitable catalysts the novel complex between cobalt, carbon monoxide, and phosphine ligand may be monomeric in structure or may be composed of several monomeric units. Thus, the novel complex may be present as a dimer, e.g., a bis(phosphine) dicobalt hexacarbonyl.

It will be apparent from the preceding discussion that a variety of bicyclic heterocyclic tert-phosphine ligands may be used in the novel catalysts of the invention. In the nomenclature of such compounds, conventional numbering of the ring systems has been employed, as further illustrated by the following formulas:

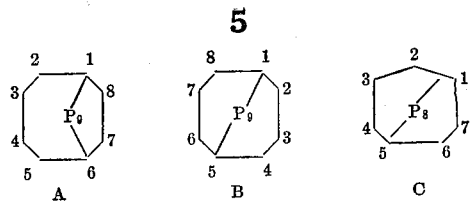

Representative examples of suitable catalysts of the above-defined class comprise novel complexes between cobalt, carbon monoxide, and one or a mixture of the following phosphine groups, numbered according to the aforesaid system, especially as the bis(phosphine) dicobalt hexacarbonyl: 9-hydrocarbyl-9-phosphabicyclononane in which the smallest P-containing ring contains at least 5 atoms;

9-hydrocarbyl-9-phosphabicyclo[4.2.1]nonane;
9-aryl-9-phosphabicyclo[4.2.1]nonane, such as
9-phenyl-9-phosphabicyclo[4.2.1]nonane;
(di)alkyl-9-aryl-9-phosphabicyclo[4.2.1]nonane, such as
3,7-dimethyl-9-phenyl-9-phosphabicyclo[4.2.1]nonane and
3,8-dimethyl-9-phenyl-9-phosphabicyclo[4.2.1]nonane;
9-alkyl-9-phosphabicyclo[4.2.1]nonane, such as
9-octadecyl-9-phosphabicyclo[4.2.1]nonane,
9-hexyl-9-phosphabicyclo[4.2.1]nonane,
9-eicosyl-9-phosphabicyclo[4.2.1]nonane, and
9-triacontyl-9-phosphabicyclo[4.2.1]nonane;
9-cycloalkyl-9-phosphabicyclo[4.2.1]nonane, such as
9-cyclohexyl-9-phosphabicyclo[4.2.1]nonane and
9-(1-bicyclo[2.2.0]octane)-9-phosphabicyclo[4.2.1]nonane;
9-cycloalkenyl-9-phosphabicyclo[4.2.1]nonane, such as
9-cyclooctenyl-9-phosphabicyclo[4.2.1]nonane;
9-hydrocarbyl-9-phosphabicyclo[3.3.1]nonane;
9-aryl-9-phosphabicyclo[3.3.1]nonane, such as
9-phenyl-9-phosphabicyclo[3.3.1]nonane;
9-alkyl-9-phosphabicyclo[3.3.1]nonane, such as
9-hexyl-9-phosphabicyclo[3.3.1]nonane and
9-eicosyl-9-phosphabicyclo[3.3.1]nonane;
(di)alkyl-9-aryl-9-phosphabicyclo[3.3.1]nonane, such as
3,7-dimethyl-9-phenyl-9-phosphabicyclo[3.3.1]nonane and
3,8-dimethyl-9-phenyl-9-phosphabicyclo[3.3.1]nonane;
9-cycloalkyl-9-phosphabicyclo[3.3.1]nonane, such as
9-cyclohexyl-9-phosphabicyclo[3.3.1]nonane and
9-(1-bicyclo[2.2.0]octane-9-phosphabicyclo[3.3.1]nonane;
9-cycloalkenyl-9-phosphabicyclo[3.3.1]nonane, such as
9-cyclooctenyl-9-phosphabicyclo[3.3.1]nonane;
8-phosphabicyclo[3.2.1]octane;
8-hydrocarbyl-8-phosphabicyclo[3.2.1]octane;
8-aryl-8-phosphabicyclo[3.2.1]octane, such as
8-phenyl-8-phosphabicyclo[3.2.1]octane;
alkyl-8-aryl-8-phosphabicyclo[3.2.1]octane, such as
6-methyl-8-phenyl-8-phosphabicyclo[3.2.1]octane;
8-alkyl-8-phosphabicyclo[3.2.1]octane, such as
8-butyl-8-phosphabicyclo[3.2.1]octane,
8-eicosyl-8-phosphabicyclo[3.2.1]octane,
8-triacontyl-8-phosphabicyclo[3.2.1]octane, and
8-octadecyl-8-phosphabicyclo[3.2.1]octane;
8-cycloalkyl-8-phosphabicyclo[3.2.1]octane, such as
8-cyclohexyl-8-phosphabicyclo[3.2.1]octane; and the like.

Of these catalysts, those in which the tert-phosphine is 9-alkyl-9-phosphabicyclo[4.2.1]nonane, 9-alkyl-9-phosphabicyclo[3.3.1]nonane, 8 - alkyl - 8-phosphabicyclo[3.2.1]octane, 9-aryl-9-phosphabicyclo[4.2.1]nonane, 9-aryl-9-phosphabicyclo[3.3.1]nonane, or 8-aryl-8-phosphabicyclo[3.2.1]octane are somewhat preferred. A particularly preferred catalyst comprises cobalt-tricarbonyl-9-phenyl-9-phosphabicyclo[4.2.1]nonane, believed to be dimeric

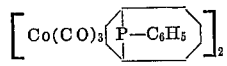

and a mixture thereof with

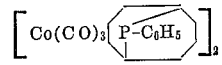

The novel catalysts can be prepared by a diversity of methods. A convenient method is to combine a cobalt salt, organic or inorganic, with the desired phosphine ligand, for example, in liquid phase followed by reduction and carbonylation. Suitable cobalt salts comprise, for example, cobalt carboxylates such as acetates, octanoates, etc. as well as cobalt salts of mineral acids such as chlorides, fluorides, sulfates, sulfonates, etc. Operable also are mixtures of these cobalt salts. It is preferred, however, that when mixtures are used, at least one component of the mixture be cobalt alkanoate of 6 to 12 carbon atoms. The valence state of the cobalt may be reduced and the cobalt-containing complex formed by heating the solution in an atmosphere of hydrogen and carbon monoxide. The reduction may be performed prior to the use of the catalysts or it may be accomplished simultaneously with the hydroformylation process in the hydroformylation zone. Alternatively, the novel catalysts can be prepared from a carbon monoxide complex of cobalt. For example, it is possible to start with dicobalt octacarbonyl and, by heating this substance with a suitable phosphine ligand of the class previously described, the ligand replaces one or more of the carbon monoxide molecules, producing the desired catalyst. When this latter method is executed in a hydrocarbon solvent, the complex may be precipitated in crystalline form by cooling the hot hydrocarbon solution. X-ray analyses of the isolated crystalline solid show the crystalline form of the complex to be a dimer with a linear P-Co-Co-P group in the molecule. For example, bis(9-phenyl-9-phosphabicyclo[3.3.1]nonane) dicobalt hexacarbonyl, recrystallized from n-tridecanol, is a red-brown-colored crystalline solid, M.P. 198–199° C. (dec.) and exhibiting a strong carbonyl absorption band at a wave number of 1947 $cm^{-1}$. This method is very convenient for regulating the number of carbon monoxide molecules and phosphine ligand molecules in the catalyst. Thus, by increasing the proportion of phosphine ligand added to the dicobalt octacarbonyl, more of the carbon monoxide molecules are replaced.

In accordance with the invention, olefinic compounds are hydroformylated to reaction products predominating in primary alcohols by intimately contacting the olefinic compound in liquid phase with carbon monoxide and hydrogen in the presence of the above-defined catalysts comprising a complex of cobalt with certain phosphine ligands and carbon monoxide at well defined conditions of temperature and pressure.

A particular advantage of the process of the invention resides in the catalyst stability and its high activity for long periods of time at very low pressures. Consequently, hydroformylation in accordance with the present invention may be carried out at pressures well below 1000 p.s.i.g. to as low as 1 atmosphere or less. Under comparable conditions, the conventional catalyst, dicobalt octacarbonyl, decomposes and becomes inactive. The invention is, however, not limited in its applicability to the lower pressures, and pressures in the range from atmospheric up to about 2000 p.s.i.g. are useful. Even higher ones, such as up to about 5000 p.s.i.g., may be employed. The specific pressure preferably used will be governed to some extent by the specific charge and catalyst employed, as well as equipment requirements. In general, pressures in the range of from about 300 to about 1500 p.s.i.g. and particularly in the range of from about 400 to about 1200 p.s.i.g. are preferred. The unique stability of the catalysts of the present invention at the lower pressures makes the use of pressures below about 1500 p.s.i.g. particularly advantageous.

Temperatures employed will generally range between about 100° and about 300° and preferably between about 125° and about 210° C., a temperature of about 150° C. being generally satisfactory. Somewhat higher or lower temperatures may, however, be used.

The ratio of catalyst to the olefin to be hydroformylated is generally not critical and may vary widely. It may be varied to achieve a substantially homogeneous reaction mixture. Solvents are therefore not required. However, the use of solvents which are inert, or which do not interfere to any substantial degree with the desired hydroformylation reaction under the conditions employed, may be used. Saturated liquid hydrocarbons, for example, may be used as solvent in the process, as well as alcohols, ethers, acetonitrile, sulfolane, and the like. Molar ratios of catalyst to olefin in the reaction zone at any given instant between about 1:1000 and about 10:1 are found to be satisfactory; higher or lower catalyst to olefin ratio may, however, be used, but in general it will be less than 1:1.

The ratio of hydrogen to carbon monoxide charged may vary widely. In general, a mole ratio of hydrogen to carbon monoxide of at least about 1 is employed. Suitable ratios of hydrogen to carbon monoxide comprise those within the range of from about 1 to about 10. Higher or lower ratios may, however, be employed. The ratio of hydrogen to carbon monoxide preferably employed will be governed to some extent by the nature of the reaction product desired. If conditions are selected that will result primarily in an aldehyde product, only one mole of hydrogen per mole of carbon monoxide enters into reaction with the olefin. When the primary alcohol is the preferred product as in the present invention, two moles of hydrogen and one mole of carbon monoxide react with each mole of olefin. The use of ratios of hydrogen to carbon monoxide which are somewhat higher than those defined by these stoichiometrical values are generally preferred.

A signal advantage of the present invention as indicated above and further evidenced by the following examples is the ability to effect the direct, single-stage hydroformylation of the olefins to a reaction mixture wherein primary alcohols predominate over the aldehydes and by-product saturated hydrocarbons. The alcohols obtained from the starting olefins are furthermore generally primarily the straight chain or normal isomers. By selection of reaction conditions within the above-defined range, it is now possible to obtain a predominant portion of the product in the form of the normal or straight chain compound rather than as its various branched-chain isomers. Generally, the alcohol is the desired end product and the catalysts defined herein will produce this product under a relatively wide range of conditions. However, by varying the operating conditions within the range described herein, the ratio of aldehyde to alcohol product may be varied somewhat. Adjustment of these variables also permits some control over the particular isomer that will be produced.

A particularly valuable aspect of the invention resides in its ability to effect the direct, single-stage hydroformylation of internal normal olefins, having for example, from 4 to 19 carbon atoms to the molecule to normal terminal alcohols having 5 to 20 carbon atoms to the molecule, respectively. Olefinic hydrocarbon fractions, such as, for example, polymeric olefinic fractions, cracked wax fractions, and the like, containing substantial proportions of internal olefins are readily hydroformylated to fractions of hydroformylated products comprising mixtures of terminal aldehydes and alcohols having one more carbon than the olefins in the charge and wherein these primary alcohols are the predominant reaction product. Such suitable feeds consisting of olefinic hydrocarbon fractions include, for example $C_7$, $C_8$, $C_9$, $C_{10}$ and higher olefinic fractions as well as olefinic hydrocarbon fractions of wider boiling ranges such as $C_{7-9}$, $C_{10-13}$, $C_{14-17}$ olefinic hydrocarbon fractions and the like.

Under the above-defined conditions, the olefinic charge reacts with carbon monoxide and hydrogen with the formation of reaction products comprising primary alcohols having one more carbon atom per molecule than the olefin charged.

The reaction mixtures obtained may be subjected to suitable catalyst and product separating means comprising one or more such steps, for example, as stratification, solvent extraction, distillation, fractionation, adsorption, ect. Catalyst, or components thereof, as well as unconverted charge, may be recycled in part or entirely to the reaction zone.

The process of this invention is generally applicable to the hydroformylation of any aliphatic or cycloaliphatic compound having at least one aliphatic carbon-to-carbon unsaturation, especially an ethylenic carbon-to-carbon bond. Thus, it is applied to the hydroformylation of olefins having, for example, from 2 to 19 carbons to reaction mixtures predominating in aliphatic aldehydes and alkanols having one more carbon atom than the starting olefin. The invention is used to advantage in the hydroformylation of carbon-to-carbon ethylenically unsaturated linkages in hydrocarbons. Monoolefins such as ethylene, propylene, butylene, cyclohexene, 1-octene, dodecene, 1-octadecene and dihydronaphthalene are a few examples of suitable hydrocarbons. Suitable hydrocarbons include both branched- and straight-chain, as well as cyclic, compounds having one or more of these ethylenic or olefinic sites. These sites may be conjugated, as in 1,3-butadiene, or non-conjugated, as in 1,5-hexadiene and bicyclo[2.2.1]hepta-2,5-diene. In the case of polyolefins, it is possible to hydroformylate only one of the olefinic sites or several or all of these sites. The unsaturated carbon-to-carbon olefinic linkages may be between terminal and their adjacent carbon atoms, as in 1-pentene, or between internal chain carbon atoms, as in 4-octene.

The process and novel catalyst of this invention may also be used to hydroformylate ethylenic carbon-to-carbon linkages of non-hydrocarbons. Thus, it is possible to hydroformylate olefinically unsaturated alcohols, aldehydes, and acids to corresponding alcohols, aldehydes, and acids containing an aldehyde or hydroxy group on one of the carbon atoms previously involved in the olefinic bond of the starting material; unsaturated aldehydes yield principally diols. The following are a few specific examples of different types of olefinic compounds that may be hydroformylated in accordance with the invention:

$$CH_3(CH_2)_3CH=CH_2 + H_2 \xrightarrow[\Delta]{catalyst}$$
1-hexene $CH_3(CH_2)_5CHO$ and/or $CH_3(CH_2)_5CH_2OH$ + isomeric products
1-heptanal          1-heptanol $$CH_2=CHCl + CO + H_2 \xrightarrow[\Delta]{catalyst}$$

$ClCH_2CH_2CH_2OH$ and/or $ClCH_2CH_2CHO$ + isomeric products
3-chloropropanol     3-chloropropanal $$CH_3COOCH_2CH=CH_2 + CO + H_2 \xrightarrow[\Delta]{catatys}$$
allyl acetate $CH_3COOCH_2CH_2CH_2CHO$
γ-acetoxybutyraldehyde and/or    $CH_3COOCH_2CH_2CH_2CH_2OH$ + isomeric products
Δ-acetoxybutanol

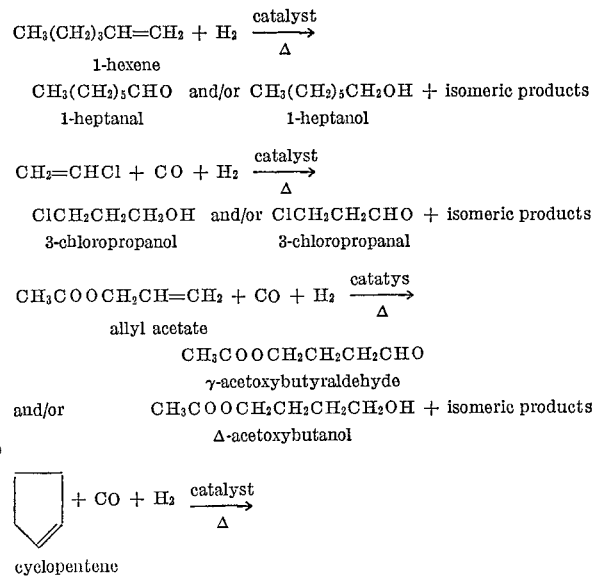

cyclopentene

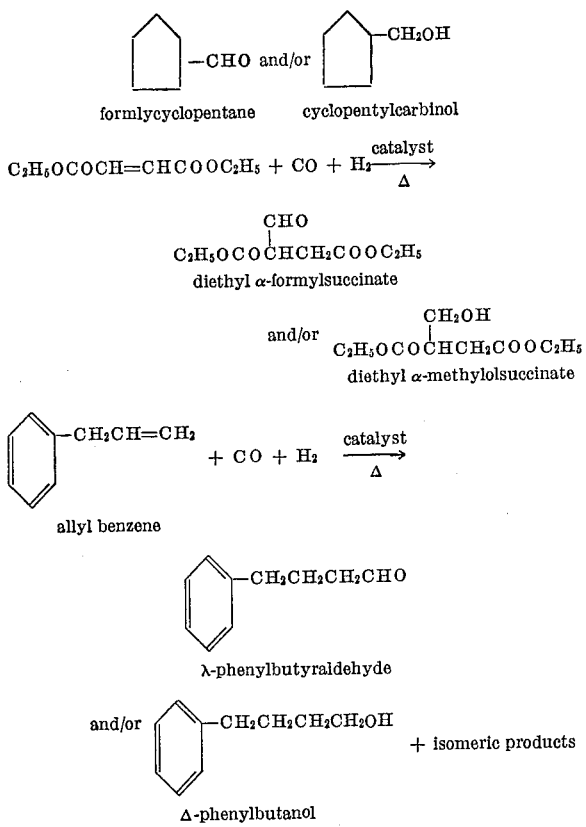

The olefinic charge may comprise two or more of the above-defined suitable olefins. Olefinic hydrocarbon fractions are hydroformylated under the conditions above-defined to mixtures of aldehydes and alcohols in which the alcohols predominate.

The following examples are illustrative of the process of this invention. It is to be understood that these examples are given only for illustration and are not to be construed as limiting the invention to the details thereof.

Examples 1 and 2

Cobalt catalysts of cobalt in complex combination with carbon monoxide and the below-indicated tertiary phosphine ligands were utilized with 1-dodecene as olefin. The catalysts were prepared in situ, in the equipment to be described, from cobalt octanoate.

The reactor was a 300-ml. stainless steel magnetically stirred autoclave operated at 1250 r.p.m. and connected to a source of a premixed hydrogen-carbon monoxide gas delivered at any desired constant pressure. The components forming the catalyst (e.g., tertiary phosphine and cobalt octanoate) and the olefin, 1-dodecene, were charged to the reactor; the reactor was closed, evacuated, and pressured with $H_2$-CO gas until all foreign gases were displaced. The reactor was then heated under sufficient $H_2$+CO pressure so that the final pressure at reaction temperature was about 1000 p.s.i.g. After the temperature was equilibrated, the pressure reduction was recorded. The reaction conditions and results are tabulated in Table 1.

Example 1 below, utilizing the commercially available tri-n-butylphosphine, as the phosphorus ligand, was taken as a comparative control. A comparison between Example 1 and Example 2 shows that the quantity of undesirable saturated hydrocarbon by-product formed when using as ligand the bicyclic heterocyclic tert-phosphine of the invention is less by a factor of about one-half than that formed when using tri-n-butylphosphine, in spite of the fact that the hydrogenating activity of the novel catalyst in Example 2 was sufficient to insure essentially complete hydrogenation of the intermediate aldehyde.

TABLE 1. HYDROFORMYLATION OF 1-DODECENE

| | Example | |
|---|---|---|
| | 1 | 2 |
| Phosphine Ligand | Tri-n-butyl phosphine | Mixture of 9-phenyl-9-phosphabicyclo [4.2.1]nonane and 9-phenyl-9-phosphabicyclo [3.3.1]nonane |
| Cobalt, percent wt | 0.2 | 0.2 |
| Phosphine/cobalt mole ratio | 2 | 2 |
| $H_2$/CO mole ratio | 2.1 | 2.1 |
| Temperature, °C | 198-202 | 198-200 |
| Pressure, p.s.i.g | 1,000 | 1,200 |
| Time required for 9% conversion, hr | 3.6 | 1.5 |
| Conversion of 1-dodecene, percent | 99.1 | 100 |
| Conversion to saturated hydrocarbon, percent | 20.4 | 11.8 |
| Conversion to primary alkanols, percent | 78.2 | 87.6 |

Example 3

1-dodecene was hydroformylated in the manner described in the previous examples by reaction with carbon monoxide and hydrogen in a $H_2$/CO mole ratio of 2:1, at 198–203° C., a pressure of 1000 p.s.i.g., with a contact time of 30 hours in the presence of a catalyst consisting of triphenylphosphine-cobalt-carbonyl at a phosphine/cobalt mole ratio of 2:1. There was obtained a conversion of 98.8% of the olefin with a selectivity to $C_{13}$ alcohols of 86.1%. Of the $C_{13}$ alcohols obtained, 52% was the linear, straight-chain n-tridecanol, the remainder branched-chain alcohols.

Similarly 1-dodecene was hydroformylated by reaction with carbon monoxide and hydrogen in a $H_2$/CO mole ratio of 2:1, at 183° C., a pressure of 1000 p.s.i.g., with a contact time of 6 hours in the presence of a novel catalyst consisting of a mixture of 9-eicosyl-9-phosphabicyclo[4.2.1]nonane-cobalt-carbonyl and 9-eicosyl-9-phosphabicyclo[3.3.1]nonane-cobalt-carbonyl at a phosphine/cobalt mole ratio of 1.5:1. There was obtained a conversion of the olefin of 98.5% with a selectivity to $C_{13}$ alcohols of 86.9%. Of the $C_{13}$ alcohols obtained, 89% was the linear, straight-chain n-tri-decanol, the remainder branched-chain alcohols.

It is seen from the foregoing results that with triphenylphosphine as the phosphorus ligand of the catalyst the predominance of the highly desirable linear straight-chain or normal alcohol over the branched-chain isomers is not so great as with novel catalyst in which the phosphorus ligand is the bicyclic heterocyclic tert-phosphine of the invention.

Example 4

1-dodecene was hydroformylated in the manner described in the previous examples with the addition that alkali was added in a KOH/cobalt mole ratio of 0.75:1. By reaction with carbon monoxide and hydrogen in a $H_2$/CO mole ratio of 2:1, at 200–203° C., a pressure of 1000 p.s.i.g., with a contact time of 5.5 hours in the presence of a catalyst consisting of trilaurylphosphine-cobalt-carbonyl at a phosphine/cobalt mole ratio of 1.5:1, there was obtained a conversion of 99.2% of the olefin with a conversion to primary $C_{13}$ alcohols of 83.2%.

Similarly 1-dodecene was hydroformylated at 183–185° C. with a contact time of six hours in the presence of a novel catalyst consisting of a mixture of 9-eicosyl-9-phosphabicyclo[4.2.1]nonane - cobalt - carbonyl and 9-eicosyl - 9-phosphabicyclo[3.3.1]nonane-cobalt-carbonyl. There was obtained a conversion of 98.5% of the olefin with a conversion to primary $C_{13}$ alcohols of 86.9%.

Similarly 1-dodecene was hydroformylated at 185° C. with a contact time of five hours at a pressure of 1200 p.s.i.g. in the presence of a novel catalyst consisting of a mixture of 9 - phenyl - 9 - phosphabicyclo[4.2.1]nonanecobalt-carbonyl and 9 - phenyl - 9 - phosphabicyclo[3.3.1]
nonane-cobalt-carbonyl. There was obtained a conversion
of 99.4% of the olefin with a conversion to primary $C_{13}$
alcohols of 88.2%.

The foregoing results of obtaining a similar conversion
at about the same contact time but at approximately 15°
C. lower temperature demonstrate the exceptionally rapid
rate of hydroformylation achieved by the new and improved
hydroformylation catalyst in which the phosphorus
ligands are the bicyclic heterocyclic tert-phosphines of the
invention as compared with the rate achieved when a trialkylphosphine
such as trilaurylphosphine is the phosphorus ligand of the catalyst.

Example 5

1-dodecene was hydroformylated in the manner described
in Example 4 by reaction with carbon monoxide
and hydrogen in a $H_2/CO$ mole ratio of 2:1, at 163–165°
C., a pressure of 1200 p.s.i.g., with a contact time of 11
hours in the presence of a catalyst consisting of 9-phenyl-
9 - phosphabicyclo[3.3.1]nonane - cobalt - carbonyl at a
phosphine/cobalt mole ratio of 1.5:1. There was obtained
a conversion of the olefin of 95% with a conversion to
primary $C_{13}$ alcohols of 83.4%. Of the $C_{13}$ alcohols obtained,
87.6% was the linear, straight-chain-n-tridecanol.

Example 6

1-dodecene was hydroformylated in the manner described
in Example 4 by reaction with carbon monoxide
and hydrogen in a $H_2/CO$ mole ratio of 2:1, at 183–185°
C., a pressure of 1200 p.s.i.g., with a contact time of 6
hours in the presence of a catalyst consisting of a mixture
of 9 - eicosyl - 9-phosphabicyclo[4.2.1]nonane-cobalt-carbonyl
and 9 - eicosyl - 9-phosphabicyclo[3.3.1]nonane-cobalt-carbonyl
at a phosphine/cobalt mole ratio of 1.3:1.
There was obtained a conversion of the olefin of 98.5%
with a conversion to primary $C_{13}$ alcohols of 86.9% and
to by-product saturated hydrocarbon of 11.6%. Repetition
of this example with a decrease in pressure to 600
p.s.i.g. and slight increase in contact time to seven hours
yielded a conversion about equal to that obtained at the
higher pressure, 98.4% of the olefin, 86.6% to primary
$C_{13}$ alcohols and 11.7% to by-product saturated hydrocarbon.

Example 7

A series of internal normal olefins was prepared by
chlorination of straight-chain paraffins followed by dehydrochlorination
to a corresponding mixture of substantially
internal olefins containing less than 5% of the 1-
olefin. By this method internally unsaturated tetradecenes,
internally unsaturated tridecenes, internally unsaturated
dodecenes, and internally unsaturated undecenes were
each prepared. Each of these internal olefins was hydroformylated
in the manner described in Example 4 by
reaction with carbon monoxide and hydrogen in a $H_2/CO$
mole ratio of 2:1, at 170° C., a pressure of 1200 p.s.i.g.,
with a contact time of 7.5 to 9 hours in the presence of
a catalyst consisting of a mixture of 9-eicosyl-9-phosphabicyclo[4.2.1]nonane
- cobalt - carbonyl and 9-eicosyl-9-
phosphabicyclo[3.3.1]nonane-cobalt-carbonyl at a weight
percent cobalt of 0.4 and a phosphine/cobalt mole ratio
of 2:1. The results are tabulated in Table 2, demonstrating
the effectiveness of the novel catalysts to convert internal
normal olefins to a substantial quantity of normal
terminal alcohols.

TABLE 2.—HYDROFORMYLATION OF INTERNAL OLEFINS

| Internal olefin | Conversion of olefin, percent | Conversion to primary alkanols, percent | Linear, straight-chain alkanol, percent |
|---|---|---|---|
| Tetradecene | 98.6 | 83.1 | n-Pentadecanol, 84.0. |
| Tridecene | 96.5 | 84.2 | n-Tetradecanol, 86.6. |
| Dodecene | 95.9 | 86.7 | n-Tridecanol, 87.5. |
| Undecene | 95.5 | 82.4 | n-Dodecanol, 89.7. |

A further economic advantage obtainable with the catalysts
of the present invention is that, in continuous hydroformylation
processing, longer catalyst life is achieved
by virtue of the ability to hydroformylate at lower temperatures.
Additionally, these catalysts are more stable
during the hydroformylation process owing to the fact
that their resistance to oxidation and degradation is higher
than that of catalysts having a trialkylphosphine ligand.

We claim as our invention:
1. The process for the direct, single-stage production
of reaction products consisting predominantly of primary
alkanol which comprises reacting a monoolefinic hydrocarbon
with carbon monoxide and hydrogen at a temperature
between about 100° and 300° C. and superatmospheric
pressure in the presence of a catalyst consisting essentially
of cobalt in complex combination with carbon
monoxide and a bicyclic heterocyclic tert-phosphine of
the formula

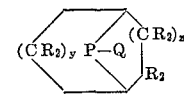

where Q represents hydrocarbyl of from 1 to 36 carbon
atoms, R is selected from the group consisting of hydrogen
and alkyl of from 1 to 4 carbon atoms such that no
more than two R groups are alkyl at any one time and
that each of said alkyl groups is attached to a different
ring carbon, and y and z represent positive integers whose
sum is from 2 to 3.

2. The process in accordance with claim 1 wherein said
reaction products consist predominantly of primary alkanol,
said olefinic hydrocarbon reacted is a monoolefinic
hydrocarbon and said pressure is between about 1
atmosphere and 2000 p.s.i.g.

3. The process in accordance with claim 2 wherein said
monoolefinic hydrocarbon reacted is one having from 4
to 19 carbon atoms to the molecule and Q represents hydrocarbyl
of from 4 to 30 carbon atoms.

4. The process in accordance with claim 3 wherein said
reaction products consist predominantly of straight chain
terminal alkanol of 5 to 20 carbon atoms to the molecule,
said monoolefinic hydrocarbon reacted is a straight
chain internal monoolefin, said pressure is between about
400 and 1200 p.s.i.g., said R is hydrogen and said y and
z are positive integers whose sum is 3.

5. The process in accordance with claim 3 wherein said
monoolefinic hydrocarbon has from 7 to 9 carbon atoms
to the molecule.

6. The process in accordance with claim 3 wherein said
monoolefinic hydrocarbon has from 10 to 13 carbon atoms
to the molecule.

7. The process in accordance with claim 3 wherein said
monoolefinic hydrocarbon has from 14 to 17 carbon atoms
to the molecule.

8. The process in accordance with claim 1 wherein the
sum of said Q and said R is no greater than 38 carbon
atoms.

9. The process in accordance with claim 3 wherein said
phosphine is 9-eicosyl-9-phosphabicyclononane in which
the smallest phosporus-containing ring contains at least
5 atoms.

10. The process in accordance with claim 3 wherein said
phosphine is 9-phenyl-9-phosphabicyclononane in which
the smallest phosphorus-containing ring contains at least
5 atoms.

(References on following page)

References Cited

UNITED STATES PATENTS

| | | | |
|---|---|---|---|
| 2,564,130 | 8/1951 | Schreyer | 260—632 |
| 3,102,899 | 9/1963 | Cannell | 260—632 |
| 3,239,569 | 3/1966 | Slaugh et al. | 260—632 |
| 3,310,576 | 3/1967 | Mertzweiller et al. | 260—439 |

OTHER REFERENCES

Hatch: "Higher Oxo Alcohols" (1957), pp. 6 to 19.

Maier: "Progress in Inorganic Chemistry," vol. 5 (1963), pp. 155 to 166 and 178.

LEON ZITVER, *Primary Examiner.*

J. E. EVANS, *Assistant Examiner.*

U.S. Cl. X.R.

260—439, 485, 491, 598, 599, 604, 606.5, 617, 618, 633, 635, 638, 666